INVENTOR.
ROBERT COURTLAND DENNISON
BY
W. H. Spouagle
Attorney

INVENTOR.
ROBERT COURTLAND DENNISON
BY
W. H. Sprouagle
Attorney

INVENTOR.
ROBERT COURTLAND DENNISON
BY
W. H. Sprouagle
Attorney

DELAY COMPENSATION CIRCUIT ARRANGEMENT

Filed April 3, 1964 8 Sheets-Sheet 4

INVENTOR.
ROBERT COURTLAND DENNISON
BY
W. H. Sprouagle
Attorney

Feb. 6, 1968 R. C. DENNISON 3,368,035

DELAY COMPENSATION CIRCUIT ARRANGEMENT

Filed April 3, 1964 8 Sheets-Sheet 5

INVENTOR.
ROBERT COURTLAND DENNISON
BY
W. H. Sprague
Attorney

Feb. 6, 1968 R. C. DENNISON 3,368,035

DELAY COMPENSATION CIRCUIT ARRANGEMENT

Filed April 3, 1964 8 Sheets-Sheet 6

INVENTOR.
ROBERT COURTLAND DENNISON
BY
W. H. Sprouagle
Attorney

DELAY COMPENSATION CIRCUIT ARRANGEMENT

Filed April 3, 1964

8 Sheets-Sheet 7

INVENTOR.
ROBERT COURTLAND DENNISON
BY
W. H. Spouagle
Attorney

DELAY COMPENSATION CIRCUIT ARRANGEMENT

Filed April 3, 1964 8 Sheets-Sheet 8

INVENTOR.
ROBERT COURTLAND DENNISON
BY
[signature]
Attorney

United States Patent Office 3,368,035 Patented Feb. 6, 1968

3,368,035
DELAY COMPENSATION CIRCUIT ARRANGEMENT

Robert C. Dennison, Westmont, N.J., assignor to Radio Corporation of America, a corporation of Delaware
Filed Apr. 3, 1964, Ser. No. 357,237
5 Claims. (Cl. 178—69.5)

This invention relates to television broadcast apparatus and more particularly to a circuit arrangement for compensating for signal delays occuring in the apparatus.

Television broadcast apparatus include one or more camera chains, each having a camera component for generating a video signal representative of an image which is to be broadcast, and a processor component for varying certain characteristics of the video signal. For generating the video signal, the camera component includes a light-sensitive pick-up device such as an image orthicon and a deflection circuit arrangement for deflecting an electron beam in the pick-up device across a target thereof. The video signal is coupled by a transmission line to the processor component wherein certain charateristics of the signal such as shading, gamma, and contrast are controlled.

In order to synchronize the operation of a camera chain with other camera chains and with other components of the apparatus, a synchronizing signal is applied to the processor and is coupled therefrom to the camera by a transmission line. The synchronizing signal controls electron beam deflection at the camera and thus regulates the generation of the video signal.

The processor component can be located at a television studio or it may form a part of a mobile television unit. In either case, it is desirable to provide mobility in the operation of the camera and, at times, to operate the camera at locations relatively remote with respect to the processor. Accordingly, a cable, which is provided for intercoupling the camera and processor components and which includes the synchronizing and video signal transmission lines, is relatively long. In practice, the cable extends up to lengths as great as 1,500 feet. This relatively long cable subjects the synchronizing and video signals to delays during their transmission between the camera and processor components. These delays cause the video signal to lag the synchronizing signal at the processor by a period of time equal to the sum of the synchronizing and video signal cable delays. The lag period can be of a magnitude which inhibits a desired synchronization between the video signal and the synchronizing signal at the processor component. Further, it is desirable, at times, to use different lengths of interconnecting cable and the magnitude of video signal lag will therefore differ in accordance with the lengths of cable employed. Circuit means are thus provided to assure proper synchronization between the video and synchronizing signals at the processor when relatively long and differing lengths of cable are employed.

Prior television broadcast apparatus have compensated for the delays in transmission by providing circuit means which cause the deflection of an electron beam in the camera pickup device and an accompanying generation of the video signal at the camera to be advanced in time with respect to a synchronizing signal at the camera. The deflection is advanced by a period of time sufficient for compensating for cable delays and for effecting desired synchronization between the video and synchronizing signals at the processor.

It is an object of the present invention to provide a novel circuit arrangement for effecting an advance in the generation of the video signal at the camera.

Another object of this invention is to provide a novel signal advance circuit having manually adjustable circuit means for providing different periods of advance for associated differing lengths of interconnecting cable.

A viewfinder having a kinescope viewing device is generally provided at the camera jn order to facilitate operation of the camera. The deflection of an electron beam of the kinescope and an electron beam of the camera pick-up device must be synchronized for proper camera operation. However, when transistor amplifying devices are utilized in deflection circuit arrangements of the kinescope and camera pick-up device, certain characteristics of the transistors, such as minority carrier storage, introduce additional circuit delays. Variations in these characteristics cause differing delays in the deflection circuits and prevent the desired synchronization of the electron beams.

It is another object of this invention to provide a circuit arrangement adapted for compensating both for delays occurring in the transmission of the video and synchronizing signals over the interconnecting cable and for delays arising as a result of the electrical characteristics of transistors utilized in the circuit arrangement.

The viewfinder is generally utilized to observe the scene being viewed by the associated camera. It is frequently desirable for the camera operator to observe an image being viewed by the camera of another camera chain. A video signal representative of the other image is therefore coupled from the other camera chain to a switching unit at the studio and thence to a local viewfinder at the desired camera location via an associated processor and by an interconnecting cable. Although this remotely generated video signal will be synchronized with other signals of the apparatus at the mixer and at the associated processor, a delay is introduced in the transmission of this video signal over the interconnecting cable. The novel camera circuit arrangement of the present invention provides an advance in pick-up device deflection and the remotely generated signal will thus be out of synchronization with this deflection.

It is a further object of this invention to provide a camera circuit arrangement which effects synchronization between a synchronizing signal and locally generated video signal at an associated processor and which is adapted to synchronize the kinescope deflection with a remotely generated video signal.

Still another object of the invention is to provide for synchronization of the deflection of electron beams in a camera pickup device and an associated viewfinder kinescope when either a locally or a remotely generated video signal is coupled to the kinescope.

In accordance with the persent invention, a television broadcast apparatus includes a camera component for generating a video signal, a processor component for controlling characteristics of the video signal, means for applying a synchronizing signal to the processor component, a cable for coupling synchronizing and video signals between the camera and processor components, and novel circuit means located at the camera for compensating for signal delays occurring in the apparatus. The compensating circuit means comprises a feedback form of automatic phase controlled timing signal generator for generating a camera timing signal which is advanced in time with respect to a synchronizing signal at the camera. The generator includes manually adjustable signal delay means arranged in a feedback loop for varying the advance of the camera timing signal by a period of time which compensates for delays introduced by the cable. Delay equalizing circuit means are provided for compensating for differing delays occurring in circuits of the camera pickup device and the view-finder and for causing coincident deflection of the electron beams of these devices. Circuit means are also provided for coupling a remotely generated video signal from a remote source to a viewfinder of the camera, and for deriving from the timing signal generator both the camera timing signal and a secondary viewfinder timing signal, the primary signal being advanced in time with respect to the secondary timing signal.

These and other features of the invention will become apparent with reference to the following specifications and drawings in which.

Figure 2:
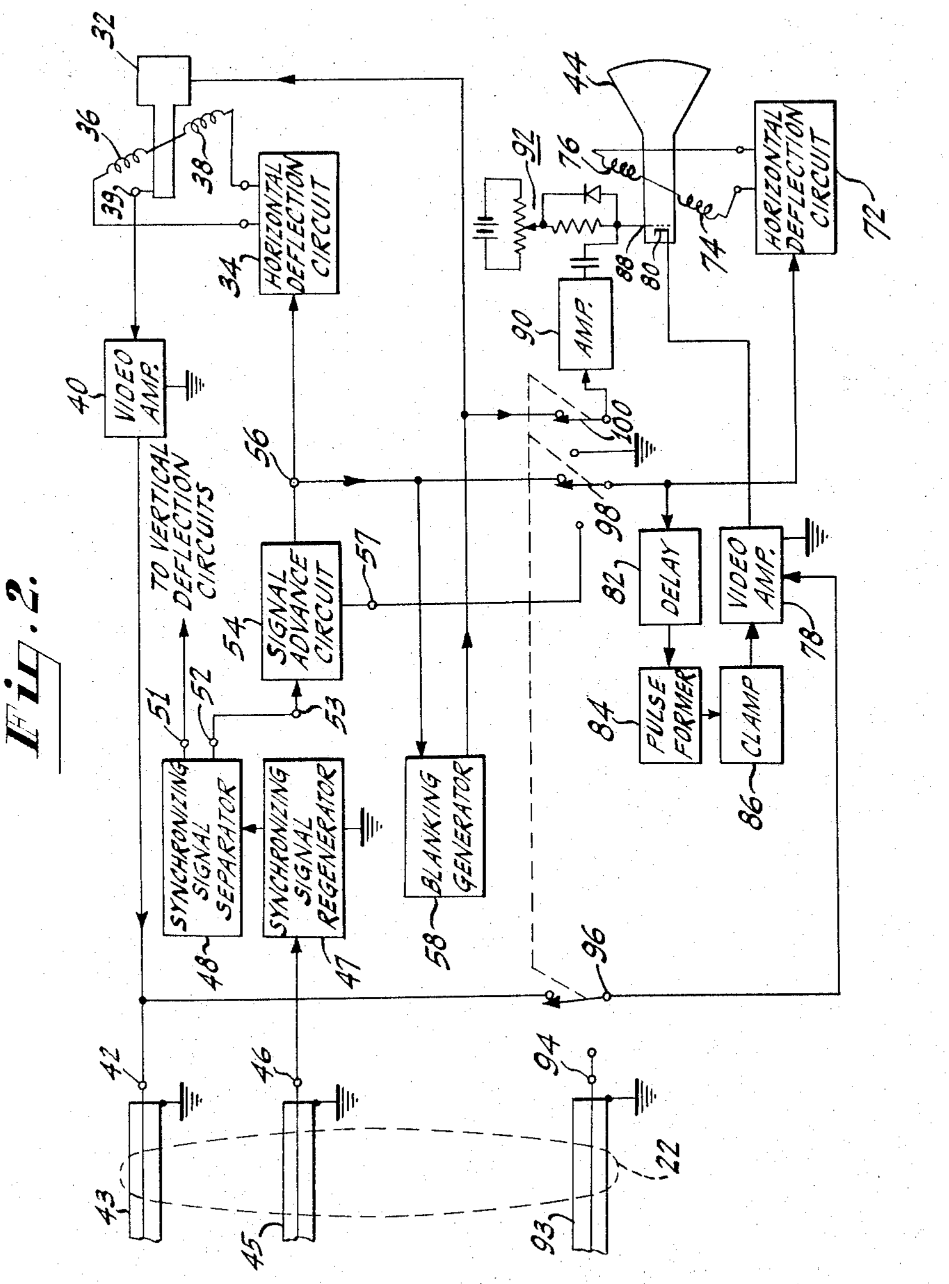
FIGURE 2 is a detailed block diagram of a camera component of the apparatus of FIGURE 1 which includes an embodiment of the present invention.
Figure 3:
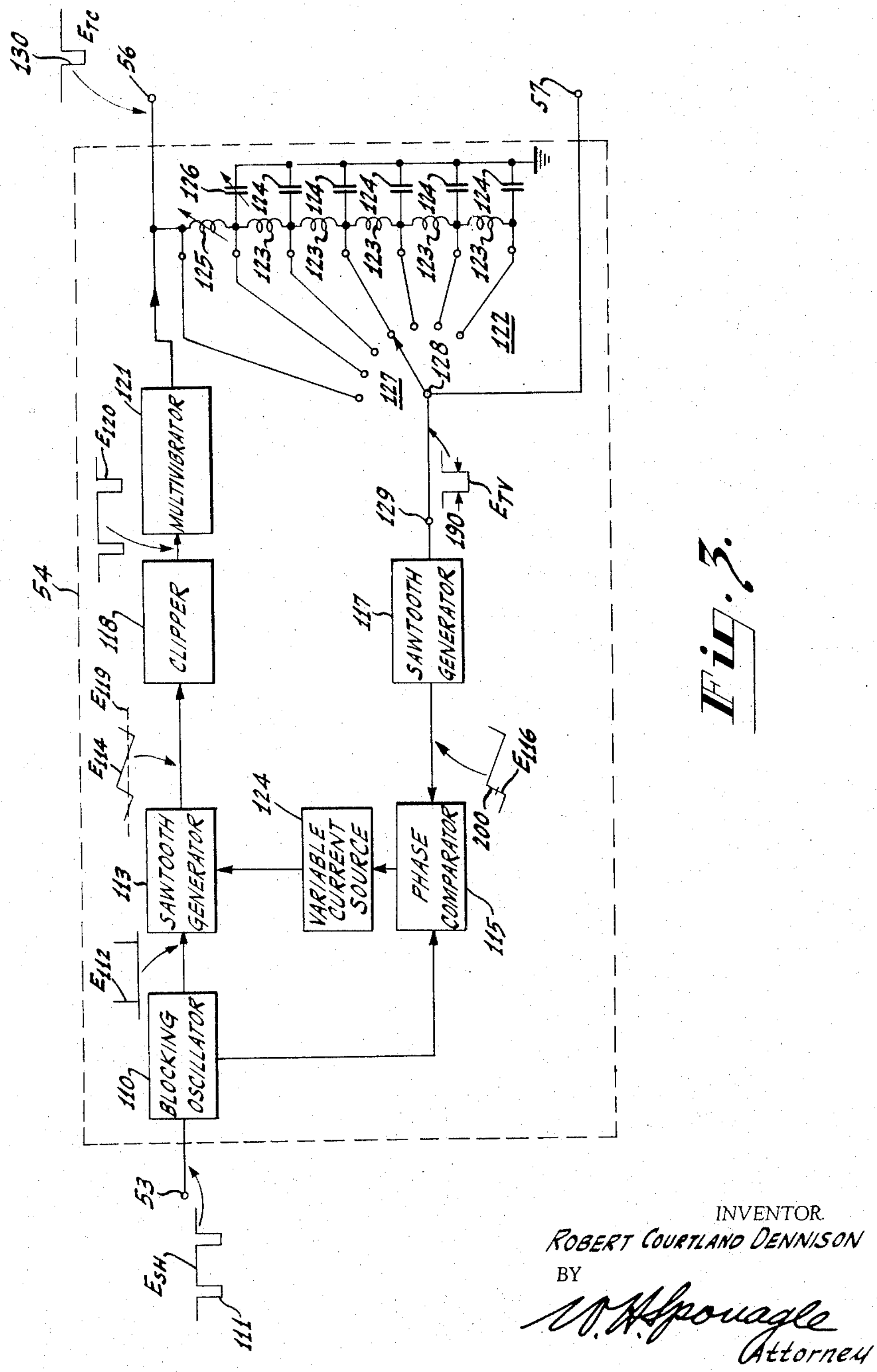
FIGURE 3 is a block diagram of a signal advance circuit utilized in the camera arrangement of FIGURE 2.
Figures 7, 8, 9, 10:
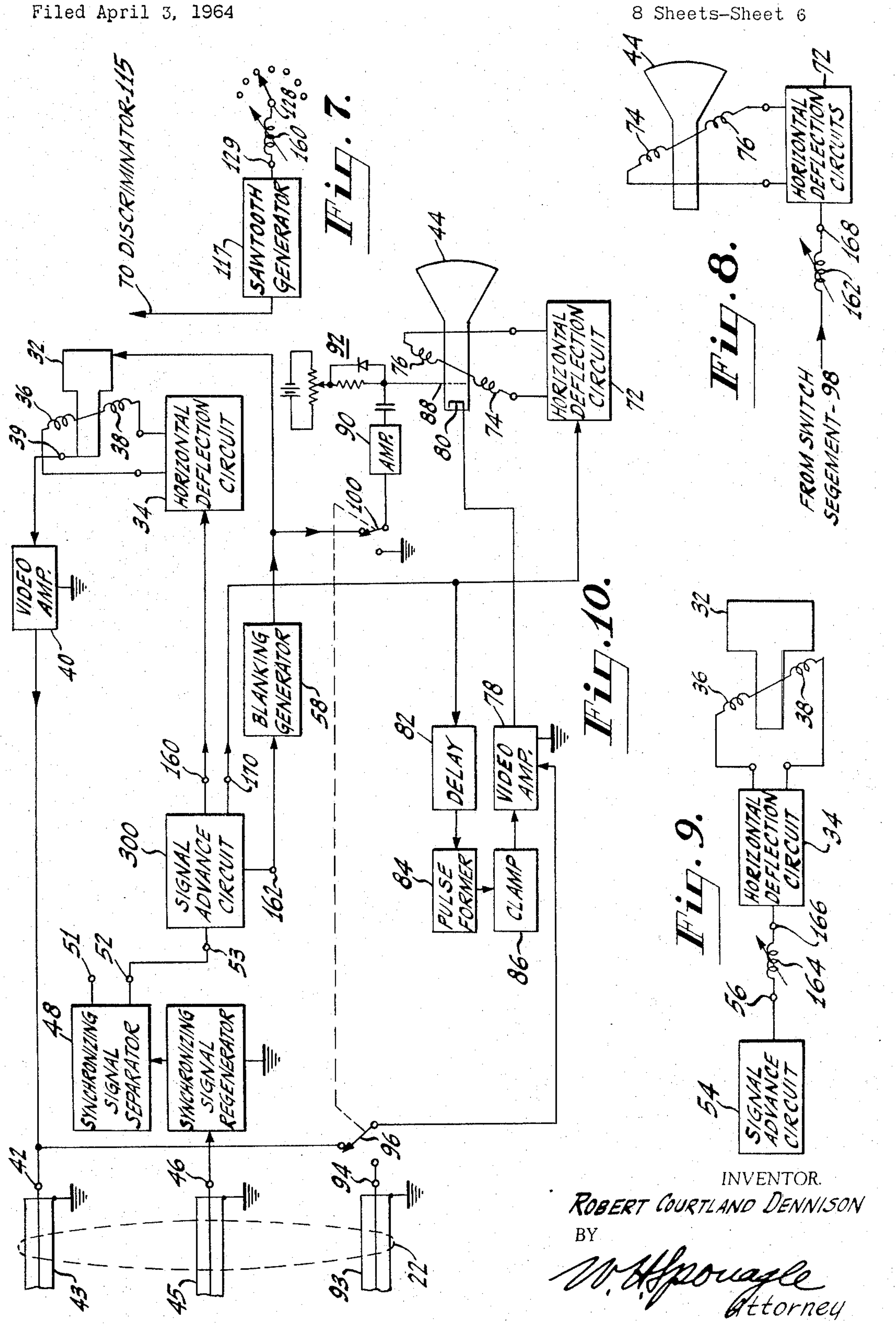

FIGURES 7, 8, and 9 are diagrams illustrating modifications to the arrangements of FIGURES 2 and 3 for providing compensation for the electrical characteristics of transistors utilized in the apparatus;

FIGURE 10 is a diagram of a camera component illustrating another arrangement for compensating for the electrical characteristics of transistors utilized in the apparatus.

Figure 11:
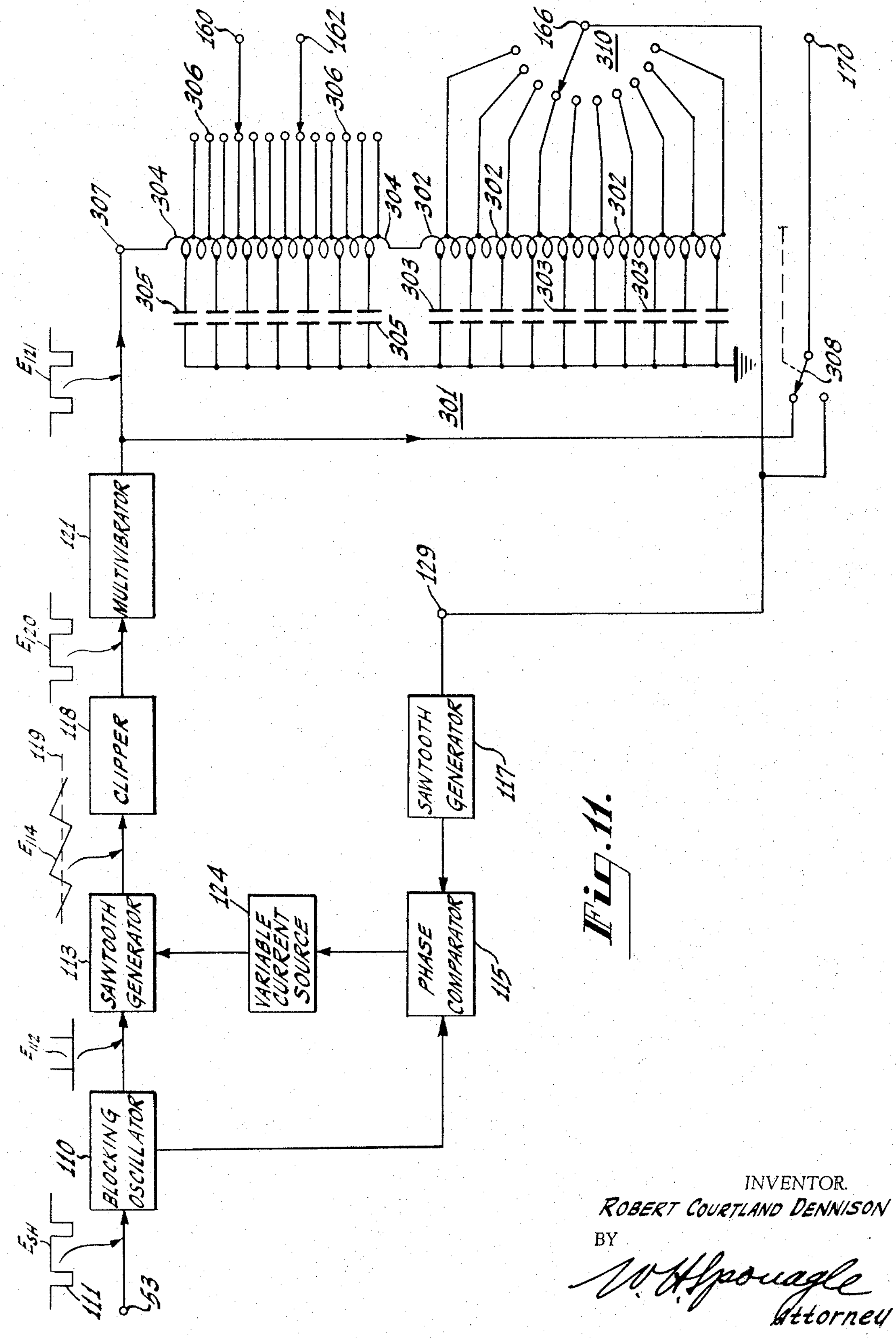
Figure 12:
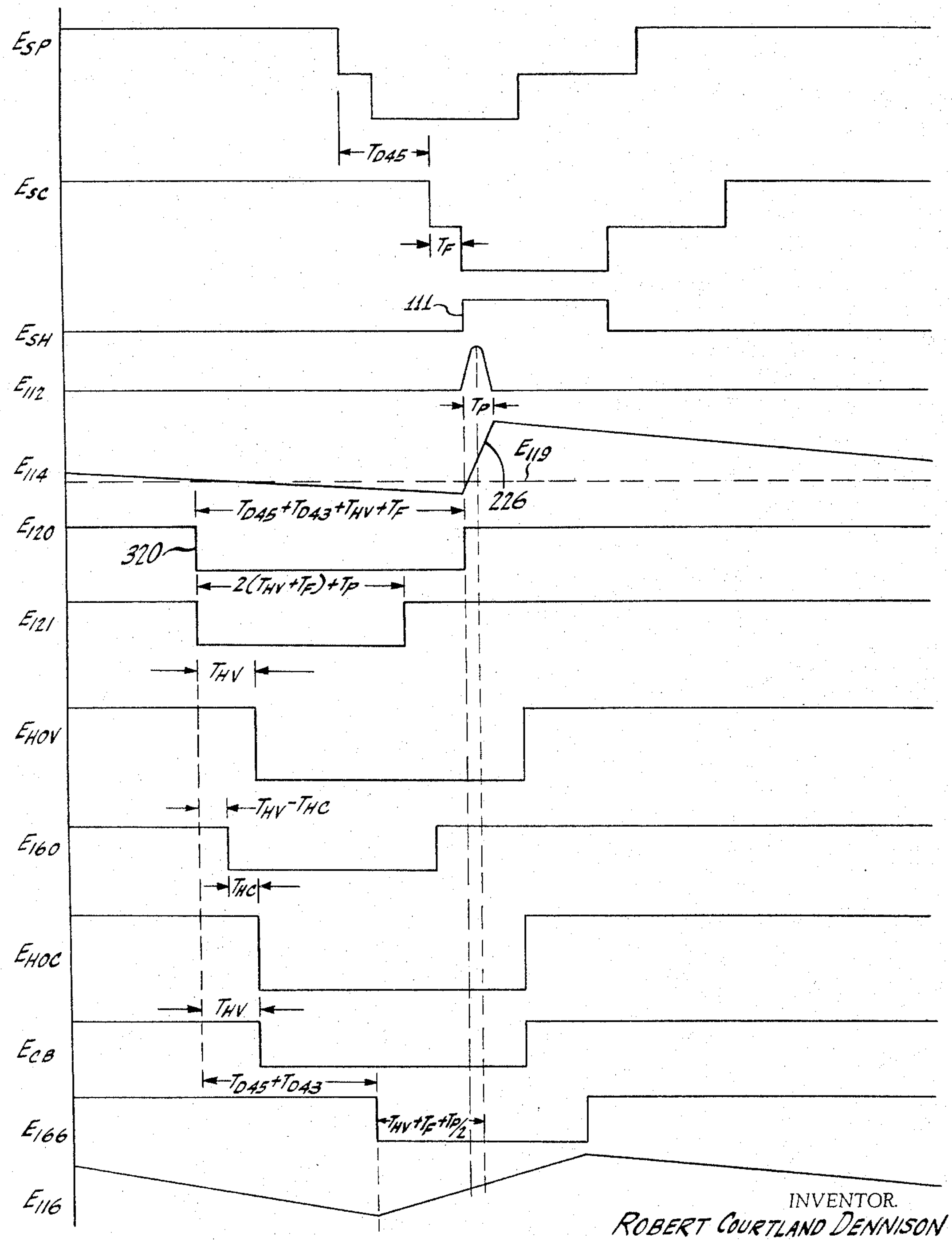

FIGURE 11 is a diagram of a signal advance circuit for use with the camera of FIGURE 12; and FIGURE 12 is a diagram illustrating the waveforms occurring in the signal advance circuit of FIGURE 11.

Figure 1:
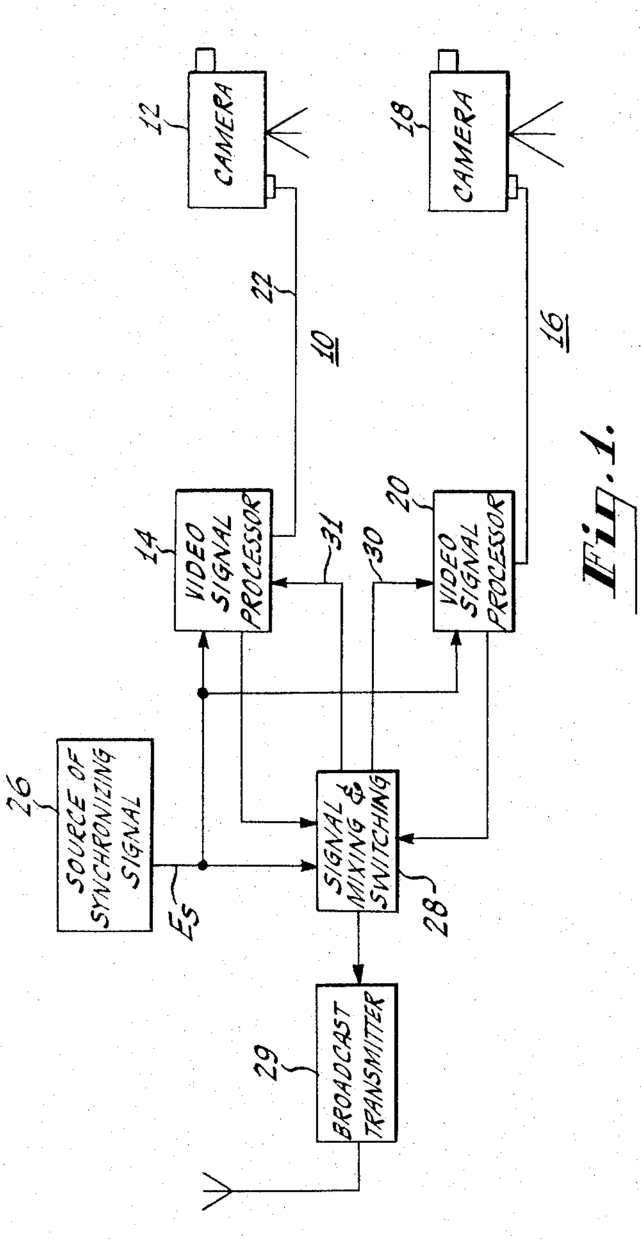
FIGURE 1 is a block diagram of a television broadcast apparatus.

The television broadcast apparatus of FIGURE 1 includes a first camera chain 10 having camera and video signal processor components 12 and 14, respectively, and a second camera chain 16 having camera and video signal processor components 18 and 20, respectively. The camera component 12 is positioned for viewing a scene to be televised and a video signal representative of the scene is generated by the camera and coupled by a transmission line of a cable 22 to the processor 14. Similarly, a video signal is generated by the camera 18 and is coupled by a transmission line of a cable 24 to an assoicated processor 20. For synchronizing the operation of various circuits of the cameras and processors with other components of the appparatus, a composite NTSC synchronizing signal, indicated generally as $E_s$, is generated by a souce 26 and is coupled both to the video signal processor 14 and thence to the camera 12 by a transmission line of cable 22, and to the video signal processor 20 and thence to the camera 18 by a transmission line of cable 24. The synchronizing signal, and the video signals at the processors, are also coupled to a sigal mixing and switching unit 28. The unit 28 selects a video signal for broadcast and superimposes the synchronizing signal upon the selected video signal. A selected video signal is then coupled from the unit 28 to a transmitter 29 for broadcast to television receiving apparatus. In addition, the mixer unit 28 also serves to switch a video signal of camera 12 to a viewfinder of camera 18 via a short transmission line 30, the video processor 20, and a transmission line of the cable 24. Similarly, a video signal from camera 18 is switched to a view-finder of camera 12 via a short transmission line 31, the processor 14, and a transmission line of the cable 22.

Figure 4:
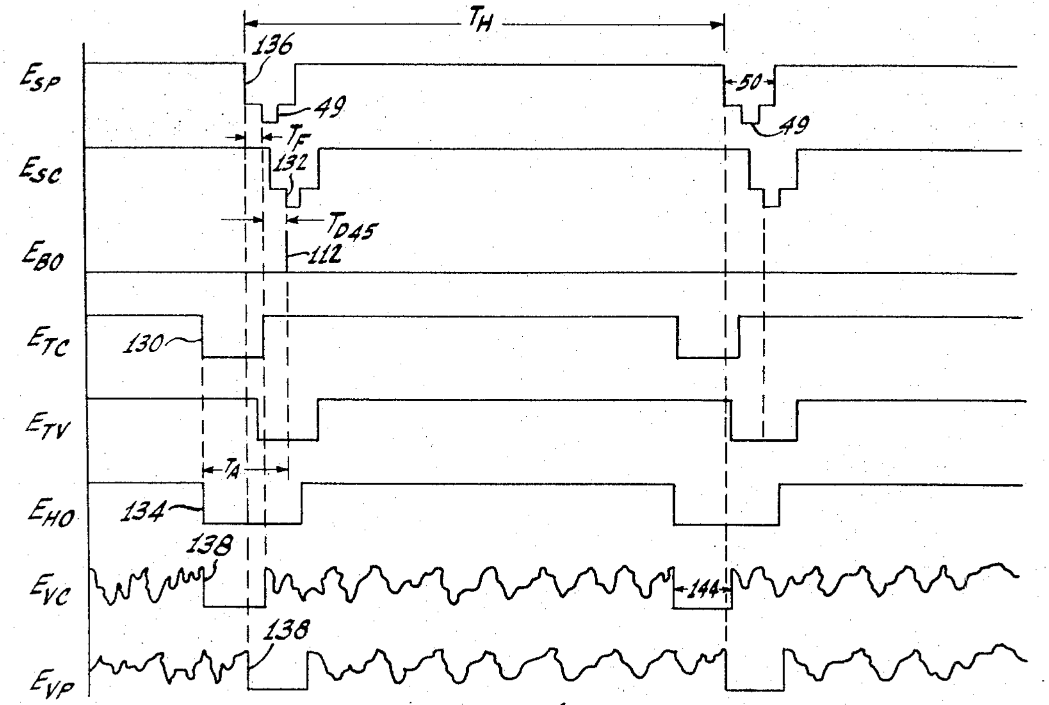
FIGURE 4 is a diagram illustrating the various waveforms and relative timing of signals occurring in the arrangements of FIGURES 2 and 3.

The camera component 12 is illustrated in greater detail in FIGURE 2. The camera includes a light sensitive pick-up device 32, such as an image orthicon, for generating a video signal when an electron beam of the pick-up device is deflected across a target thereof. A horizontal deflection circuit 34 causes a periodically recurring current of generally sawtooth waveform to flow in deflection windings 36 and 38 and thereby provides horizontal scanning of the electron beam. The generated video signal $E_{vc}$ (FIGURE 4), occurring at an output terminal 39 of the device 32, is preamplified by a video frequency amplifier 40 and is coupled to a camera output terminal 42 for transmission to video signal processor 14. A transmission line 43 of the cable 22, which is represented in FIGURE 2 by the dotted lines, couples the video signal from the terminal 42 to the processor 14. The video signal at the processor is indicated as $E_{vp}$ (FIGURE 4). As discussed hereinafter, the video signal is also coupled from the video frequency amplifier 40 to a kinescope 44 of the camera viewfinder.

A synchronizing signal at the processor, indicated as $E_{sp}$ (FIGURE 4), is coupled from the processor 14 by a transmission line 45 of cable 22 to a camera input terminal 46. Because of waveform deterioration occurring as the result of transmission of the synchronizing signal over a relatively long line, the synchronizing signal at camera input terminal 46, indicated as $E_{sc}$ (FIGURE 4), is applied to a signal regenerator arrangement 47 for reshaping of the signal's waveform. The reshaped signal is coupled to a synchronizing signal separator circuit 48. Although only components occurring at a horizontal rate $T_H$ are illustrated in FIGURE 4, the NTSC synchronizing signal includes horizontal, vertical and horizontal deflection of the electron beam of the pick-up device 32. The separator 48 separates horizontal and vertical synchronizing components 49 and provides vertical synchronizing components at an output terminal 51 and horizontal synchronizing components $E_{SH}$ (FIGURE 3) at an output terminal 52. The synchronizing components 49 are shown superimposed upon the blanking component 50 in FIGURE 4 in order to illustrate the relative timing of these components. The vertical components are coupled to conventional vertical deflection circuit means, not illustrated, for providing a desired vertical deflection of the election beam of the pick-up device 32 and of the kinescope 44. A horizontal synchronizing component is coupled from terminal 52 to an input terminal 53 of a signal advance circuit 54. The advance circuit 54, which is discussed in greater detail hereinafter, generates a camera timing signal $E_{TC}$ (FIGURE 4), advanced in time with respect to a leading step segment of a synchronizing component 49 of the synchronizing signal $E_{SC}$. The camera timing signal is provided at an output terminal 56 and is applied to the horizontal deflection circuit 34 for causing synchronization of horizontal beam deflection. A deflection waveform occurring in the deflection circuit and representative of beam deflection is illustrated as $E_{HO}$ (FIGURE 4). In addition to the camera timing signal at terminal 56, a secondary viewfinder timing signal $E_{TV}$ (FIGURE 4), whose function is described hereinafter, is generated by the signal advance circuit 54 and provided at an output terminal 57. The camera timing signal $E_{TC}$ drives a blanking signal generator 58 and synchronizes blanking of the electron beam of the pick-up device 32 during a retrace interval of the horizontal deflection cycle. The blanking generator may also be utilized with circuit means, not illustrated, for causing vertical blanking of the electron beam.

In order that a camera operator may accurately observe the scene being viewed by the pick-up device 32 and to facilitate operation of the camera in general, a viewfinder is provided for the camera. The viewfinder includes the kinescope 44, a horizontal deflection circuit 72 having deflection coils 74 and 76 for deflecting an electron beam in the kinescope, and means for applying a video signal to the kinescope. As indicated previously, the video signal of the pick-up device 32 is coupled from the video amplifier 40 to a viewfinder video amplifier 78 and thence to an electrode 80 of the kinescope for intensity modulating the electron beam in accordance with the video signal intelligence. The camera timing signal $E_{TC}$ is applied to the viewfinder deflection circuit 72 for synchonizing deflection of the electron beam in the pick-up device 32 and in the kinescope 44. In addition, the camera timing signal is applied to a delay unit 82. A delayed signal is coupled to a pulse former 84. An output pulse from the pulse former is applied to a clamp circuit 86 which establishes a blanking level for the video signal at the viewfinder video amplifier 78. Retrace blanking is provided for the viewfinder by a blanking signal which is derived from the blanking generator 58 and coupled to an electron beam control electrode 88 of the kinescope 44 via a blanking amplifier 90 and a brightness control circuit, indicated generally as 92.

The viewfinder arrangement of FIGURE 2 is adapted to display both a locally generated video signal of pick-up device 32 and a remotely generated video signal of another camera of the apparatus, such as camera 18 of camera chain 16. The remotely generated video signal is coupled from camera 18 (FIGURE 1) via the signal mixing and switching unit 28, processor unit 14, and a transmission line 93 of cable 22 to an input terminal 94 of the camera 12. A gang switch arrangement including moveable contact elements 96, 98, and 100 (FIGURE 2) is provided for selecting either a locally generated video signal mode of viewfinder operation or a remotely generated video signal mode. The switch arrangement illustrated in FIGURE 2 is positioned for displaying the locally generated video signal. When the switching elements 96, 98, and 100 are moved to the alternate switch contact position shown, the viewfinder circuit is adapted to display the remotely generated video signal.

As indicated hereinbefore, the video signal processor components and camera components may be positioned at relatively remote locations and the cables 22 and 24, which carry the synchronizing signal and video signals, are relatively long and introduce delays in the transmission of the signals. The video signal at an associated processor consequently lags the synchronizing signal at the processor and when the cable is relatively long, the amount of video signal lag is significant and inhibits proper synchronization of the signals at the processor and with other signals of the apparatus. Means comprising the signal advance circuit 54 is provided for compensating for these delays and for assuring a desired synchronization between the video synchronizing signals at the processor. Reference is now made to FIGURE 3 and FIGURE 4 for a description of the compensating circuit means and the manner of operation for assuring desired synchronization.

In FIGURE 3 the signal advance circuit 54, indicated within the dashed lines, comprises a form of an automatic phase controlled signal generator. The circuit is adapted to provide at an output terminal 56, a camera timing signal $E_{TC}$ which is advanced in time with respect to the separated horizontal synchronizing signal, $E_{SH}$, at input terminal 53. A leading edge 111 of the input signal $E_{SH}$ triggers a conventional blocking oscillator 110. A relatively narrow pulse $E_{112}$ is generated by the blocking oscillator and is coupled to a sawtooth generator 113 for synchronizing the generation of a sawtooth waveform $E_{114}$. The pulse $E_{112}$ is also coupled to a phase detector circuit arrangement 115 for phase comparison with an input sawtooth signal $E_{116}$ from a second sawtooth waveform generator 117. A clipper circuit 118 clips the sawtooth signal $E_{114}$ at a level 119 and provides a pulse $E_{120}$ for triggering a multivibrator 121. The multivibrator 121 generates the camera timing signal $E_{TC}$, having a pulse width which is independent of the sawtooth clipping level.

A phase control loop of the generator 54 includes a delay line, indicated generally as 122, the sawtooth generator 117, the phase comparator 115, and a sawtooth generator waveform control circuit 124. The circuit 124 is shown to be a variable current source. The delay line 122 comprises a plurality of inductive elements 123 and capacitive elements 124. An adjustable inductive element 125 and an adjustable capacitive element 126 are also provided. The delay line is arranged to provide an increasing electrical delay between terminal 56 and the successive taps on the line as viewed from the element 125 to the lowermost element 123 on the drawing. A manually adjustable switching means, indicated generally as 127, is provided for coupling an undelayed signal $E_{TC}$ or, for coupling the signal $E_{TC}$ through any desired length of the line, via a switching terminal 128 to an input terminal 129 of the sawtooth waveform generator 117. The signal at terminal 128 comprises the viewfinder signal $E_{TV}$.

Figure 6:
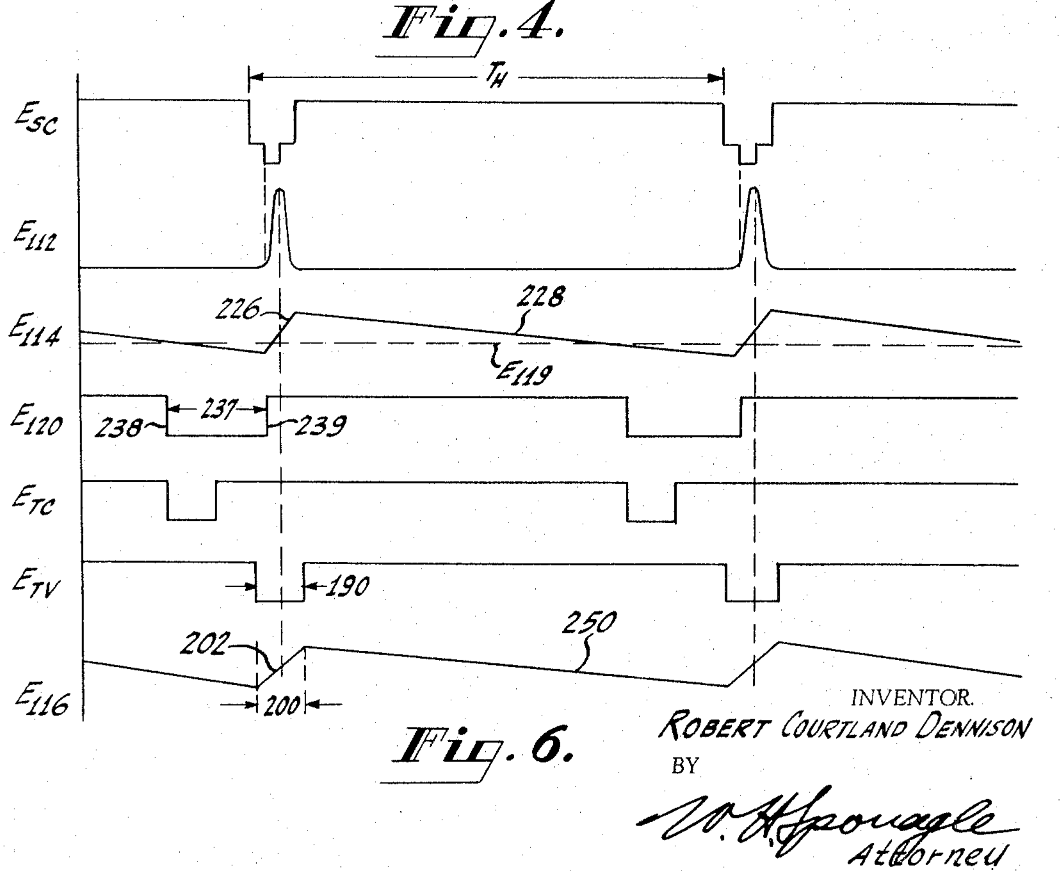
FIGURE 6 is a diagram illustrating the various waveforms and relative timing of signals occurring in the circuit of FIGURE 5.

The manner in which an advanced signal is provided by the circuit 54 may be explained with reference to FIGURES 3, 4, and 6. In FIGURE 6, the signal $E_{112}$ is exaggerated in order to clearly illustrate the timing of the signals. A pulse period 190 of the signal $E_{TV}$ (FIGURE 6), which is coupled to the generator 117, establishes the interval of a retrace segment 200 of the signal $E_{116}$ (FIGURE 6). The control loop of the advance circuit is adapted to provide phase correction when the blocking oscillator signal $E_{112}$ is anti-coincident in time with a central segment 202 of the segment 200 of the signal $E_{116}$. Deviations from this desired phase relationship are detected by the phase comparator 115 and a control signal causes the circuit 124 to vary the amplitude of a ramp segment 228 of the signal $E_{114}$ (FIGURE 6) and thus the occurrence of a leading edge 238 of pulse $E_{120}$ (FIGURE 6). This leading edge initiates the generation of $E_{TC}$. The initiation of $E_{TC}$ is varied until the desired phase relationship is reestablished. It is noted that the signal $E_{TV}$ at terminal 128 comprises the signal $E_{TC}$ at terminal 56 which is delayed in time. Since the circuit provides and maintains phase coincidence between $E_{116}$ and the blocking oscillator signal $E_{112}$ and since the signal $E_{116}$ lags the timing signal $E_{TC}$ by a period of time equal to a delay introduced by the delay line 122, a leading edge 130 of the timing signal $E_{TC}$ will be advanced in time with respect to both the blocking oscillator 112 and the signal $E_{SH}$ at terminal 53.

The period by which the signal $E_{TC}$ is advanced is equal to the delay introduced by the delay line 122. The period of signal advance may therefore be varied by operating the switching means 127 until delay elements are included or removed from the feedback loop for providing a desired advance. The variable elements 125 and 126 are adjusted to provide fine control of the advance.

The manner in which the advance circuit compensates for signal delays introduced by the cable 22 is best explained with reference to FIGURE 4. The delay time which is experienced during the transmission of a synchronizing signal over the transmission line 45 is indicated as $T_{D45}$. Generally, both the synchronizing signal and the video signal will be coupled by transmission lines of equal length and the video signal at the processor will lag the synchronizing signal at the processor by a period of time equal to the sum of the delays. In order to provide a desired synchronization of the video and synchronizing signal at the processor, the generation of the video signal at the camera is advanced. As indicated, the advance circuit 54 provides a timing signal $E_{TC}$ having a leading edge 130 which is advanced with respect to a leading edge 132 of the synchronizing signal $E_{SC}$. The timing signal $E_{TC}$ is coupled to the deflection circuit 34 and initiates early retrace and a corresponding advanced video signal generation as indicated by the step segments 134 and 138 of the signals $E_{HO}$ and $E_{VC}$ respectively. The generation of the video signal $E_{VC}$ is advanced by a period of time, $T_A$, prior to that time at which it would ordinarily occur in arrangements not utilizing a cable delay compensating circuit. The period $T_A$ has a magnitude for providing coincidence in time at the processor between a leading edge 136 of the blanking segment 50 of the signal $E_{SP}$. In order to achieve the desired advance, the period $T_A$ has a value defined as:

$$T_A = T_{D45} + T_{D43} + T_F$$

Where $T_{D45}$ is the synchronizing signal delay introduced by the transmission line 45; $T_{D43}$ is the video signal delay introduced by the transmission line 43; and $T_F$ is the front porch interval of the synchronizing signal. Since generation of the video signal is advanced by the period $T_A$, the leading edge 138 of the video signal $E_{VP}$ is accordingly coincident in time with the leading edge 136 of the signal $E_{SP}$ and the desired synchronization is accomplished.

Figure 5:
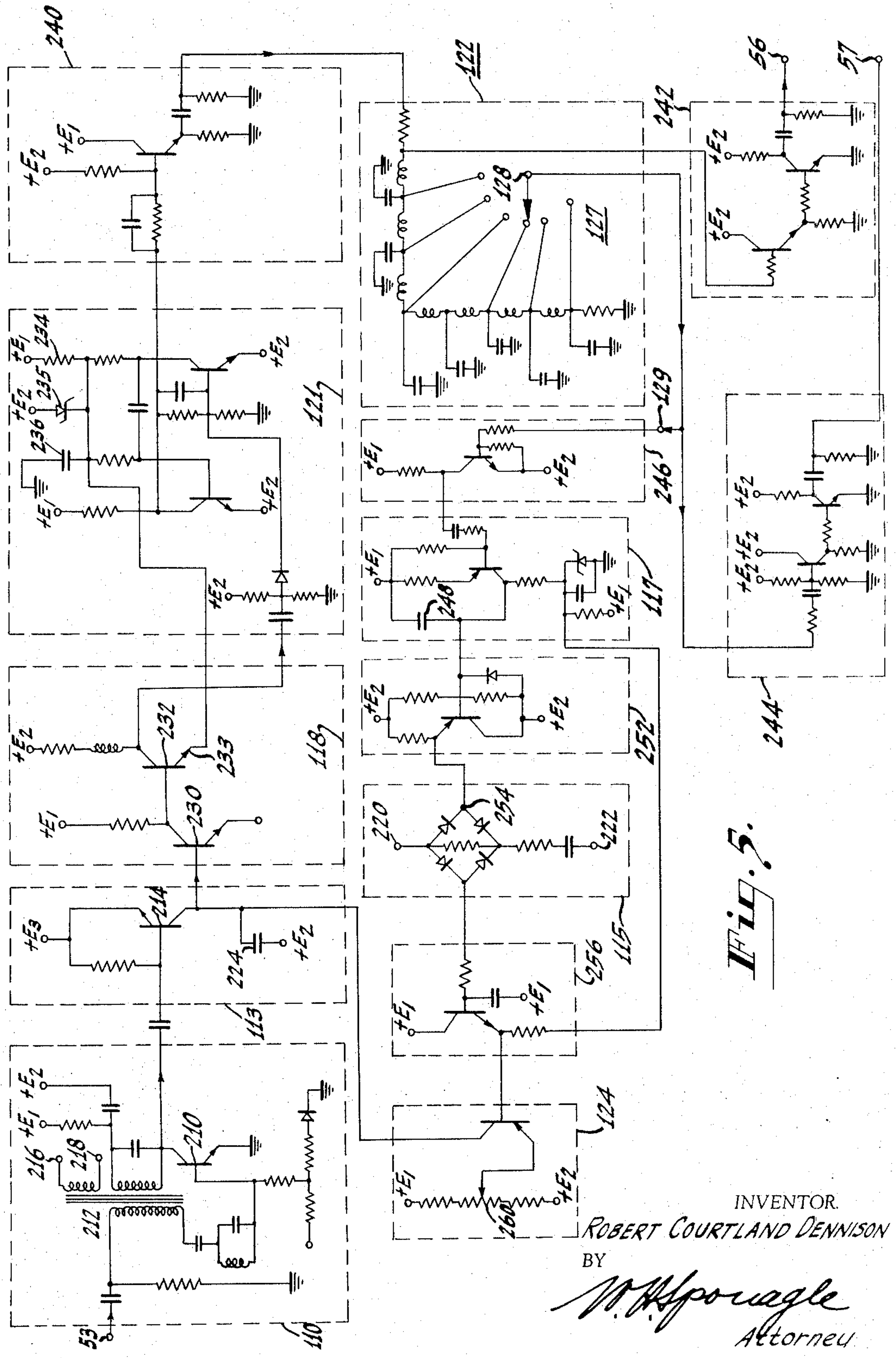
FIGURE 5 is a circuit diagram of the signal advance circuit of FIGURE 3.

A circuit diagram of the signal advance circuit 54 is illustrated in FIGURE 5. The various functional stages of FIGURE 3 are arranged within the blocks formed by dotted lines in FIGURE 5 and bear the same reference numerals. The synchronizing signal $E_{SH}$ is coupled to input terminal 53 for synchronizing the occurrence of blocking oscillator pulses $E_{112}$. Pulses $E_{112}$ which occurs at a secondary winding of a transformed 212 are coupled to a base electrode of transistor 214 of the sawtooth generator 113. The pulse $E_{112}$ is also coupled from terminals 216 and 218 of another secondary winding of the transformer 212 to terminals 220 and 222 of the phase comparator 115. The pulse $E_{112}$ at the base of transistor 214 causes the transistor to conduct collector current and to rapidly discharge a capacitor 224 of the sawtooth generator 113 for generating a segment 226 (FIGURE 6) of the sawtooth waveform $E_{114}$. At the termination of the pulse $E_{112}$, the capacitor charges and generates a ramp segment 228 (FIGURE 6) of the signal $E_{114}$. A current source 124 regulates collector current flow in the capacitor 224 and thereby establishes the amplitude of the excursion 228.

The sawtooth signal $E_{114}$ is direct coupled from a collector electrode of the transistor 214 to a clipper stage 118 which comprises a two stage clipping amplifier having transistors 230 and 232. This stage clips the signal $E_{114}$ at a level $E_{119}$ (FIGURE 6) for providing an output signal $E_{120}$. Maintenance of a desired clipping level is provided by returning an emitter electrode 233 of the transistor 232 to a circuit which establishes a desired reference potential. This circuit, located at the multivibrator 121 includes a resistor 234, a Zener diode 235, and a capacitor 236. A pulse width 237 (FIGURE 6) of the signal $E_{20}$ is established by the clipping level $E_{119}$ and the occurrence of the sawtooth wave $E_{114}$. A leading edge 238 and a trailing edge 239 of the signal $E_{120}$ are established by the clipping level. By varying the amplitude of the excursion of the segment 228, the leading edge 238 and pulse width 237 can be varied. The current source 124 is adapted to vary this excursion.

An output signal $E_{120}$ is coupled to the multivibrator 121 wherein the leading edge 238 triggers the circuit for generating an output signal $E_{TC}$. This signal is coupled to an emitter follower stage 240 for driving the delay line 122. The signal $E_{TC}$ is also coupled to an amplifier stage 242 having a cascade coupled emitter follower and common emitter transistor amplfying stages. The signal $E_{TC}$ is provided at an output terminal 56 of the amplifier 242.

A signal $E_{TV}$ at a terminal 128 of the switch 127 is coupled to an amplifier stage having a cascade coupled emitter follower and common emitter amplifier stages and is available at an output terminal 57. The signal $E_{TV}$ is also coupled to an amplifier 246 which drives a sawtooth generator circuit arrangement 117. A capacitor 248 of a sawtooth generator 117 is periodically discharged by the signal coupled from the output of amplifier 246 to the generator 117. The discharge of capacitor 248 generates the sawtooth segment 200 of the signal $E_{116}$. In an interval between the occurrence of pulses $E_{TC}$, the capacitor 248 charges and provides a segment 250 (FIGURE 6) of the sawtooth signal $E_{116}$.

An emitter amplifier follower 252 couples the signal $E_{116}$ to a bridge type detector 254 of the phase comparator 115. As indicated earlier, a blocking oscillator pluse $E_{112}$ is applied between the terminals 220 and 222 of the phase comparator. Deviations from time coincidence between a center portion 202 (FIGURE 6) of the discharge segment 200 of signal $E_{116}$ and the blocking oscillator pulse $E_{112}$ are detected by the comparator 115. A direct current voltage whose amplitude is proportional to this phase deviation is coupled to an emitter follower amplifier 256. The amplifier 256 is direct current coupled to a transistor 258 of the current source 124, varies the base voltage of this transistor, and thereby regulates the current available for charging the capacitor 224 of the sawtooth generator 113. The control of this charging current regulates the amplitude of the excursion of the segment 228 of voltage $E_{114}$. A voltage divider including a potentiometer 260 are provided in the current source 124 for establishing a desired initial amplitude of the segment 228.

As indicated, it is desirable to display either a locally or remotely generated video signal at the viewfinder. The arrangement for providing display of a locally generated signal has been described hereinbefore. FIGURE 2 also illustrates circuit means for displaying a FIGURE 2 provides synchronization at the processor remotely generated video signal. The arrangement of between the synchronizing signal $E_{SP}$ and a locally generated video signal as well as synchronization at the camera between an incoming video signal $E_{VC2}$, not illustrated, and a viewfinder timing signal $E_{TV}$. As indicated hereinbefore, the advance circuit arrangement compensates for the delay encountered by the synchronization and the video signal. However, when a remotely generated video signal is displayed it is coupled over the cable 22, and experiences substantially the same delay as an incoming synchronizing signal. Thus, while deflection of the electron beam in the pick-up device 32 is advanced by a period $T_A$, the incoming video signal $E_{VC2}$ lags the camera timing signal $E_{TC}$ at the camera and kinescope deflection must therefore be delayed. The advance circuit 54 is arranged to provide a timing signal $E_{TV}$ which is synchronized with the incoming video signal $E_{VC2}$ and is suitable for initiating deflection of the electron beam in the kinescope. In FIGURE 3, it can be seen that the signal $E_{TV}$ which exists at switch terminal 128 and at output terminal 57 is delayed with respect to the camera timing signal $E_{TC}$ by an amount equal to the advance, $T_A$. This signal $E_{TV}$ is thus delayed an amount for providing the desired synchronization. When the viewfinder is to operate with a remotely generated video signal, the switch contacts 96, 98, and 100 are moved to the alternate positions shown in FIGURE 2. The incoming video signal $E_{VC2}$ at terminal 94 is thereby coupled to the video amplifier 78 and to the electrode 80 of the kinescope 44 while the video signal $E_{VC}$ is simultaneously disconnected from the viewfinder by this action. The desired timing signal is coupled from terminal 57 via the switch contact 98 to the horizontal deflection circuit 72 while the timing signal $E_{TC}$ is similarly disconnected from the viewfinder. Since the incoming video signal will generally include a blanking component and since the units 82, 84, and the clamp 86 set a black level, the blanking signal from the generator 58 is interrupted by the switch contact 100. Thus the signal advance circuit continues to operate to provide a synchronization between $E_{SP}$ and $E_{VP}$ while the viewfinder circuit is properly timed for displaying the incoming signal $E_{VC2}$.

The use of transistors, although advantageous in reducing size and power requirements in the camera, introduces additional delays which can inhibit the desired synchronization of the video and synchronizing signals at the processor. More particularly, carrier storage characteristics of the transistors can cause a step segment 138 of the video signal $E_{VC}$ to lag a step segment 130 of the camera timing signal. Accordingly, the period of advance $T_A$ is increased to account for this additional delay. When transistors are employed, and the transistors in the camera and viewfinder deflection circuits 34 and 72, respectively, introduce equal delays, $T_T$, the advance $T_A$ may be defined as:

$$T_A=T_{D45}+T_{D43}+T_F+T_T$$

However, when the delays introduced by transistors vary due to variations in the characteristics of the transistors, delay equalizing circuit means are provided to assure synchronization.

FIGURES 7, 8, and 9 illustrate modifications to the signal advance circuit 54, the viewfinder deflection circuit, and the camera deflection circuit respectively which are collectively incorporated into the camera circuit arrangement of FIGURE 2 for providing delay equalization to compensate for variations in transistor characteristics. In FIGURE 7, an adjustable element 160 representing a delay line is coupled between the terminals 128 and 129 of the signal advance circuit 54. FIGURE 8 illustrates a similar adjustable element 162 coupled between the kinescope horizontal deflection circuit 72 and the switch contact 98 of the viewfinder while FIGURE 9 illustrates a similar element 164 coupled between the pick-up device deflection circuit 34 and the signal advance circuit 54.

In general, the modifications of FIGURES 7, 8, and 9 provide for the advance of the camera timing signal $E_{TC}$, which is coupled to the camera deflection circuit, by an additional amount equal to a delay $T_{HC}$ which is introduced by the transistors in the camera deflection circuit 34. Similarly, the timing signal $E_{TC}$ coupled to the viewfinder deflection circuit 72 is advanced by an additional amount of time equal to the delay $E_{TV}$ introduced by the transistors of the viewfinder. Variations in the delay characteristics of the referred to transistors can differ between different television broadcast apparatus. For example, in one apparatus the transistors of the camera circuits can introduce a greater delay $T_{HC}$ than a delay $T_{HV}$ which is introduced by transistors of the viewfinder, while in another television broadcast apparatus the converse can be true. The modifications of FIGURES 7, 8, and 9 remove this ambiguity and adapt the camera arrangement of FIGURE 2 to provide an overall delay $T_H$ in the deflection circuit of the pick-up device which is greater than a delay $T_{HV}$ introduced by transistors of the viewfinder deflection circuit. In providing the delay $T_H$, the element 164 of FIGURE 9 introduces an additional delay and the total horizontal delay $T_H$, which is introduced between the terminal 56 and beam deflection of device 32 is:

$$T_H=T_{164}+T_{HC}$$

where $T_{164}$ is the delay introduced by the element 164 and $T_{HC}$ is the delay introduced by the transistor characteristics of the deflection circuit. The pulse $E_{TC}$ is advanced a like amount at the signal advance circuit by the delay element 160.

$$T_{160}=T_H$$

Finally, the signal $E_{TC}$ which is coupled to the viewfinder horizontal deflection circuit 72 is delayed by an amount $T_{162}$ where:

$$T_{162}=T_H-T_{HV}$$

Adjustment of the delay lines 160, 162, and 164 to the indicated values provides the desired advance in deflection of electron beams in both the pick-up device 32 and kinescope 44 and equalizes the delay therebetween.

That the desired advances are accomplished is clearly seen from the following analysis. The signal $E_{TC}$ at terminal 56 is advanced by an amount $T_A$ where:

$$T_{A56}=T_{D45}+T_{D43}+T_F+T_{160}$$

Since $T_{160}=T_H$, $$T_{A56}=T_{D45}+T_{D43}+T_F+T_{164}+T_{HC}$$

The signal $E_{TC}$ which has experienced this advance is delayed by the element 164 and the advance of the signal $E_{TC}$ at an input terminal 166 (FIGURE 9) of the horizontal deflection circuit 34 is:

$$T_{A166}=(T_{D45}+T_{D43}+T_F+T_{164}+T_{HC})-T_{164}$$
$$T_{A166}=T_{D45}+T_{D43}+T_F+T_{HC}$$

which is the desired advance of camera deflection and video signal generation.

Similarly, the advanced signal at terminal 56 is coupled via the delay element 162 to the deflection circuit 72 (FIGURE 8) and the advance of $E_{TC}$ at an input terminal 168 is:

$$T_{A168}=(T_{D45}+T_{D43}+T_F+T_{164}+T_{HC})-T_{162}$$

Since $T_{162}=T_H-T_{HV}$, then $$T_{A168}=(T_{D45}+T_{D43}+T_F+T_{164}+T_{HC})-T_H+T_{HV}$$

and since $T_{164}+T_{HC}-T_H=0$, then $$T_{A168}=T_{D45}+T_{D43}+T_F+T_{HV}$$

which is the desired advance in kinescope deflection.

An alternate arrangement for compensating for variations in the delay introduced by the transistors of the pick-up device and kinescope deflection circuits is illustrated in FIGURE 10. In general, the arrangement of FIGURE 10 operates to compensate for the transistor delays by establishing a desired pulse width for a multivibrator signal $E_{121}$ and by utilizing, in the locally generated video signal mode of operation, a viewfinder timing signal which is advanced with respect to both a camera timing signal and the synchronizing signal $E_{SH}$. Referring now to FIGURE 11, a signal advance delay line circuit 300 of FIGURE 10 is shown to include a delay line, indicated generally as 301, having inductive elements 302 and capacitive elements 303 and additional inductive and capacitive delay line elements indicated as 304 and 305 respectively. A plurality of taps 306 is provided along segments of the delay line formed by these latter elements. Output signals are derived from this portion of the line and are available at output terminals 160 and terminal 162. The multivibrator signal $E_{121}$ is coupled to an input terminal 307 of the delay line, and also to an output terminal 170 of the signal advance circuit when a switch contact 308 is positioned as shown in FIGURE 11. The delayed signal $E_{121}$ at terminal 166 of the switch 310, indicated as $E_{166}$, is coupled to the input terminal 129 of the sawtooth generator 117. The delayed signal $E_{121}$ at terminal 160, referred to as $E_{160}$, is coupled to the horizontal deflection circuit 34 of the pick-up device for timing deflection while the signal at terminal 170, referred to as $E_{170}$, is coupled to the horizontal deflection circuit of the kinescope for timing deflection. Since the signal $E_{170}$ is coincident with signal $E_{121}$, the kinescope deflection signal $E_{170}$ is therefore advanced with respect to the camera signal $E_{160}$ for the locally generated video signal mode of viewfinder operation.

The manner in which this circuit arrangement provides the desired advance can best be explained with reference to FIGURE 12. In general, a transistorized circuit arrangement of FIGURE 10 provides a greater delay in kinescope deflection than pick-up device deflection.

For desired synchronized deflection, the kinescope deflection timing signal $E_{170}$ is to be advanced by a period, $T_{170}$ where:

$$T_{170}=T_{D45}+T_{D43}+T_{HV}+T_{F}$$

The advance, $T_{D45}+T_{D43}$, is provided by the delay line 301 of FIGURE 11. In providing the advance component, $T_{HV}+T_{F}$, the multivibrator 121 provides a signal $E_{121}$ having a pulse width $T_{121}$ where:

$$T_{121}=2(T_{HV}+T_{F})+T_{P}$$

Since the signal $E_{166}$ has a pulse width $T_{121}$ and is coupled at the center of the pulse (FIGURE 12), a leading edge 320 of the clipper output pulse $E_{120}$ (FIGURE 12) is advanced in time with respect to a center of the pulse $E_{112}$ by a period, $T_{120}$ where:

$$T_{120}=T_{D45}+T_{D43}+T_{121/2}$$

$$T_{120}=T_{D45}+T_{D43}+T_{HV}+T_{F}+T_{P/2}$$

The component $T_{P/2}$ accounts for a finite pulse width $T_{P}$ of the blocking oscillator signal $E_{112}$. The leading edge 320 of $E_{120}$ will be advanced with respect to the leading edge 111 of the synchronizing signal $E_{SH}$ by the desired period $$T_{170}=T_{D45}+T_{D43}+T_{HV}+T_{F}$$

The tap 160 of delay line 122 is adjusted to provide an electrical delay $T_{HV}-T_{HC}$ between the input terminal 307 of the line and the tap. The camera timing signal $E_{160}$ is therefore desirably delayed with respect to the viewfinder timing signal $E_{170}$ by a period equal to the difference in the delays introduced by the transistors of the deflection circuits.

Circuit timing elements of the multivibrator 121 can be adapted to provide a pulse period for the signal which is substantially close to the desired period $2(T_{HV}+T_{F})+T_{P}$. Minor and fine adjustments can be accomplished by suitably adjusting the potentiometer 260 of the current source 124 of FIGURE 5.

The blanking circuits of the kinescope and pick-up device will not generally suffer from the transistor circuit delays described. Hence, camera and kinescope blanking is delayed with respect to the camera timing signal $E_{160}$ by the period $T_{HC}$. To provide a delayed blanking signal an output terminal 162 is coupled to a tap on the delay line at a point which provides a signal delay of a period $T_{HV}$ between terminals 307 and 162. Since the signal $E_{160}$ is delayed by the amount $T_{HV}-T_{HC}$, the delay between terminals 160 and 162 is $T_{HC}$ and blanking will be properly timed.

The synchronizing signal at camera input terminal 46 has been described and illustrated in FIGURE 4 as an NTSC composite signal having a blanking component 50 and a synchronizing component 44 spaced from a leading edge of a blanking component for a front porch interval $T_{F}$. In certain television broadcast apparatus, vertical and horizontal drive pulses are generated rather than the NTS signal and are coupled to the respective deflection circuits in the same manner as described with respect to the NTSC signal. These pulses are characterized by the absence of a front porch interval $T_{F}$. Pulses of this nature may be employed with the present invention and the need for providing an advanced $T_{F}$ is accordingly eliminated.

A novel circuit arrangement has been described for providing an advance in the generation of a video signal at the camera by an amount sufficient for causing synchronization between the video signal and a synchronizing signal at the processor to thereby compensate for delays introduced in the signals by their transmission over relatively long transmission lines of different lengths. An arrangement has also been described for providing synchronization of the video signal and synchronizing signal at the processor when with a locally or remotely generated video signal is applied to a viewfinder of the camera.

In addition, circuit arrangements have been described which provide the desired synchronization as well as compensating for delay characteristics of transistor amplifying devices and for variations in these characteristics.

While there has been illustrated, described and pointed out in the annexed claims, certain novel features of the invention, it will be understood that certain variations, omissions, and substitutions in the forms and details of the system illustrated may be made by those skilled in the art without departing from the spirit of the invention and the scope of the claims.

What is claimed is:

1. A circuit arrangement for compensating for signal delays in a television broadcast apparatus comprising:
   - a camera component for generating a video signal;
   - a video signal processor component;
   - means for applying a synchronizing signal to said processor component;
   - means for coupling the synchronizing signal from said processor component to said camera component and for coupling a video signal from said camera component to said processor component;
   - said camera component having a cathode ray device,
   - a deflection circuit for deflecting an electron beam of said device across a target thereof,
   - a signal advance circuit for generating a periodic deflection circuit timing signal which is advanced in time with respect to a synchronizing signal applied thereto,
   - said signal advance circuit including an automatic phase control feedback loop having signal delay circuit means for delaying a feedback signal with respect to said timing signal.

2. A circuit arrangement for compensating for signal delays in a television broadcast apparatus comprising:
   - a camera component for generating a video signal;
   - a video signal processor component;
   - means for applying a synchronizing signal to said processor component;
   - means for coupling the synchronizing signal from said processor component to said camera component and for coupling a video signal from said camera component to said processor component;
   - said camera component having a cathode ray device,
   - a deflection circuit for deflecting an electron beam of said device across a target thereof,
   - a signal advance circuit for generating a periodic deflection circuit timing signal which is advanced in time with respect to a synchronizing signal applied thereto,
   - said signal advance circuit including an automatic phase control feedback loop having adjustable signal delay circuit means for delaying a feedback signal with respect to said timing signal.

3. A circuit arrangement for compensating for signal delays in a television broadcast apparatus comprising:
   - a camera component for generating a video signal;
   - a video signal processor component;
   - means for applying a synchronizing signal to said processor component;
   - means for coupling the synchronizing signal from said processor component to said camera component and for coupling a video signal from said camera component to said processor component;
   - said camera component having a cathode ray device,
   - a deflection circuit for deflecting an electron beam of said device across a target thereof,
   - a signal advance circuit for generating at an output terminal thereof a camera timing signal which is advanced in time with respect to a synchronizing signal applied to an input terminal thereof,
   - means applying said synchronizing signal to an input terminal of said advance circuit, and
   - means coupling said timing signal to said deflection circuit;

said signal advance circuit having a phase control circuit including a pair of input terminals, adjustable signal delay circuit means for coupling the timing signal from said output terminal to a phase detector input terminal, and means applying a signal which is coincident in time with said synchronizing signal to another input terminal of said phase control circuit, said phase control circuit arranged for causing coincidence in time between said signals at said phase control input terminals.

4. A circuit arrangement for compensating for signal delays in a television broadcast apparatus comprising:

a camera component for generating a video signal;

a video signal processor component;

means for applying a synchronizing signal to said processor component;

means for coupling the synchronizing signal from said processor component to said camera component and for coupling a video signal from said camera component to said processor component;

said camera component having a cathode ray device, a deflection circuit for deflecting an electron beam of said device across a target thereof, a signal advance circuit for generating at an output terminal thereof a camera timing signal which is advanced in time with respect to a synchronizing signal applied to an input terminal thereof, means applying said synchronizing signal to an input terminal of said advance circuit, and means coupling said timing signal to said deflection circuit;

said signal advance circuit having an oscillator for and providing a timing signal of desired waveshape at an output terminal, a sawtooth generator and clipper circuit arrangement for generating a first signal for synchronizing said oscillator, circuit means for generating a second signal of relatively narrow pulse width which is synchronized in time with said synchronizing signal at said camera, a phase detector having first and second input terminals and a control circuit arranged for varying the phase of said second signal in a manner for providing phase coincidence between signals at said detector input terminals, means coupling said second signal to said first input terminal of said phase detector, and an adjustable delay line for coupling said timing signal from said output terminal to said second input terminal of said phase detector.

5. A circuit arrangement for compensating for signal delays in a television broadcast apparatus comprising:

a camera component for generating a video signal and having a viewfinder arrangement;

a video signal processor component;

means for applying a synchronizing signal and a remotely generated video signal to said processor component;

means for coupling the synchronizing signal and remotely generated video signal from said processor component to said camera component and for coupling a locally generated video signal from said camera component to said processor component;

said camera component having an image pick-up device and a cathode ray display device, camera and viewfinder deflection circuit means for deflecting electron beams in said pick-up and cathode ray device respectively across targets therein, means applying said remotely generated video signal to said display device, a signal advance circuit for generating respectively at first and second output terminals thereof, a camera timing signal which is advanced in time with respect to a synchronizing signal applied to an input terminal thereof and a viewfinder timing signal, means applying said synchronizing signal to an input terminal of said advance circuit, and means coupling said camera timing signal to said camera deflection circuit and said viewfinder timing signal to said view finder deflection circuit;

said signal advance circuit having a phase control circuit including a pair of input terminals, adjustable signal delay circuit means coupled between said first output terminal of the advance circuit and a phase control circuit input terminal, for coupling the camera timing signal to said phase control circuit, means coupling said delay line to said second output terminal of the advance circuit in a manner for providing at said second output terminal a viewfinder timing signal which is delayed in time with respect to said camera timing signal, means applying a signal which is coincident in time with said synchronizing signal to another input terminal of said phase control circuit, said phase control circuit arranged for causing coincidence in time between said signals at said phase control input terminals.

References Cited

UNITED STATES PATENTS 3,311,702 3/1967 Legler ............. 178—69.5

JOHN W. CALDWELL, *Primary Examiner.*

R. L. RICHARDSON, *Assistant Examiner.*

UNITED STATES PATENT OFFICE
CERTIFICATE OF CORRECTION

Patent No. 3,368,035

February 6, 1968

Robert C. Dennison

It is certified that error appears in the above identified patent and that said Letters Patent are hereby corrected as shown below:

Column 4, line 26, after "and" insert -- equalizing components for synchronizing both vertical and --; line 37, "election" should read -- electron --. Column 6, line 75, after "$E_{SP}$." insert -- and a leading edge 138 of the video signal $E_{VP}$. --. Column 8, line 4, "pluse" should read -- pulse --; line 26, cancel "FIGURE 2 provides synchronization at the processor remotely generated video signal. The arrangement of" and insert -- remotely generated video signal. The arrangement of FIGURE 2 provides synchronization at the processor --.

(SEAL)

Signed and sealed this 12th day of August 1969.

Attest:

Edward M. Fletcher, Jr.
Attesting Officer

WILLIAM E. SCHUYLER, JR.
Commissioner of Patents